United States Patent [19]

Zamoyski

[11] Patent Number: 5,267,530

[45] Date of Patent: Dec. 7, 1993

[54] SELF CLEANING CAT LITTER BOX

[76] Inventor: Mark Zamoyski, 988 Foothill Dr., San Jose, Calif. 95123

[21] Appl. No.: 997,766

[22] Filed: Dec. 28, 1992

[51] Int. Cl.⁵ .................. A01K 1/01; A01K 29/00
[52] U.S. Cl. .................................... 119/166
[58] Field of Search .............. 119/163, 164, 166; 209/373, 374, 391

[56] References Cited

U.S. PATENT DOCUMENTS

| | | | |
|---|---|---|---|
| 661,723 | 11/1900 | McMaster | 209/373 X |
| 3,810,444 | 5/1974 | Conley | 119/22 |
| 3,937,182 | 2/1976 | Kamimura | 119/161 |
| 3,978,819 | 9/1976 | Lovitt | 119/22 |
| 4,120,264 | 10/1978 | Carter | 119/166 |
| 4,190,525 | 2/1980 | Menzel | 209/235 |
| 4,316,432 | 2/1982 | Kulhmann | 119/22 |
| 4,574,735 | 3/1986 | Hohenstein | 119/166 X |
| 4,696,257 | 9/1987 | Neary et al. | 119/166 |
| 4,846,104 | 7/1989 | Pierson, Jr. | 119/166 |
| 4,854,267 | 8/1989 | Morrow | 119/166 X |
| 4,934,317 | 6/1990 | Pourshalchi | 119/165 |
| 5,048,464 | 9/1991 | Shirley | 119/166 |
| 5,048,465 | 9/1991 | Carlisi | 119/166 |
| 5,226,388 | 7/1993 | McDaniel | 119/166 |

*Primary Examiner*—Robert P. Swiatek

[57] ABSTRACT

A framework residing in a cat litter box with sprockets, chains, and chain guides allowing a blade and basket mechanism to move horizontally through a cat litter box removing the cat excrement. The blade and basket are then elevated to a point at which they dump the cat excrement into an inclined chute. The cat excrement travels down the chute and into a disposable receptacle such as a plastic bag.

5 Claims, 5 Drawing Sheets

SELF CLEANING CAT LITTER BOX

BACKGROUND

Field of Invention

This invention relates to the cleaning of solid waste and cat urine saturated litter clump from a cat box.

The current general practice is to manually clean the cat litter box. Two predominant methods exist depending on the type of cat litter used. Cat owners that use cat litter material that does not clump urine will periodically remove solid waste from the litter material and eventually discard the litter material after an extended period. Cat owners using the never urine clumping cat litter will manually remove the clumped urine and solid waste from the litter box.

Many cat owners find the task of manually searching the kitty litter for cat excrement obnoxious. There are health risks from exposure to cat excrement as some cat diseases are communicable to humans.

Patents showing mechanical devices for cleaning cat litter boxes include U.S. Pat. Nos. 5,048,465; 5,048,464; 4,934,317; 4,854,267; 4,846,104; 4,574,735; 4,190,525; 4,120,264; and 3,937,182. No mechanical device for cleaning cat litter boxes has gained widespread acceptance. Most of the patented devices rely on non conventional cat litter box construction which use cylindrical, circular, or partially circular containers (U.S. Pat. Nos. 5,048,464; 4,934,317; 4,846,104; 4,574,735; 4,190,525 and 4,120,264). Such devices greatly restrict the operating area the cat has to maneuver in or must be very large to provide a comparable operating area. Devices that are similar to standard cat litter box constructions employ mechanisms such as filter belts that deposit waste into a receptacle at one side of the box (U.S. Pat. No. 3,937,182) or a rake that deposits the waste in a receptacle at one side of the box (U.S. Pat. No. 5,048,465). Devices such as that disclosed in U.S. Pat. No. 4,854,267 lift and tip the entire container while at the same time raising a screen through the material to remove wastes and store them in a separate receptacle. None of the devices have an effective means of removing urine clumps that have adhered to the floor of the cat litter box. The newer super or ultra clumping litter material not only binds with itself when wet but also forms a strong bond to a surface it comes into contact with when binding. In the rotating drum devices the urine clump may remain adhered to the wall. In other devices a layer of the urine clump will remain attached to the surface it has adhered to and/or may be fragmented by the cleaning device.

OBJECTS AND ADVANTAGES OF THE INVENTION

It is an object of the invention to provide a self cleaning cat litter box with form factor and litter surface area similar to current cat litter boxes.

It is an object of the invention to effectively remove urine clumps that have adhered to the floor of the cat litter box.

It is an object of the invention to minimize the spread of airborne particulates during the cleaning process.

It is an object of the invention to place the cat excrement in a disposable container (e.g. plastic bag) so that when the waste is eventually removed there is little to no human exposure.

It is an object of the invention to provide for the ability to have the cat excrement deposited directly into a user provided receptacle (e.g. toilet).

It is an object of the invention to make it extremely simple in design so as to make it inexpensive to manufacture and greatly reduce the potential for mechanical failures.

An advantage of the self cleaning cat litter box is its ability to remove clumped urine attached to the floor of the cat litter box. The blade, blade attachment method, and chain slack act in a manner that pitches the blade downward and under the clump severing its surface attachment without disbursing the clump. It is then collected by the wire mesh basket. Prior art devices do not have tapered, partially pivoting contact devices and consequently will either leave a layer of the clump attached to the container wall or disburse the clump leaving small fragments of the clump in the litter box.

An advantage of the self cleaning cat litter box is that human exposure to airborne contaminants is reduced. The domed enclosure not only protects the user from possible injury during mechanical operation but contains airborne particulates during the cleaning process. The excrement is deposited in a plastic bag minimizing further spread of contaminants. When the bag is eventually removed for disposal the neck may be clamped before removal to prevent airborne contamination.

An advantage of the device is its simplicity of design and low parts content which allow for inexpensive manufacture and high reliability.

SUMMARY OF THE INVENTION

Briefly, the preferred embodiment of the present invention includes a blade and basket mechanism that is pulled by chains through a cat litter box removing the cat excrement. The blade and basket are then elevated to a point at which they dump the cat excrement into an inclined chute. The cat excrement travels down the chute and into a disposable receptacle such as a plastic bag.

DETAILED STATIC DESCRIPTION OF INVENTION

Figure 1:
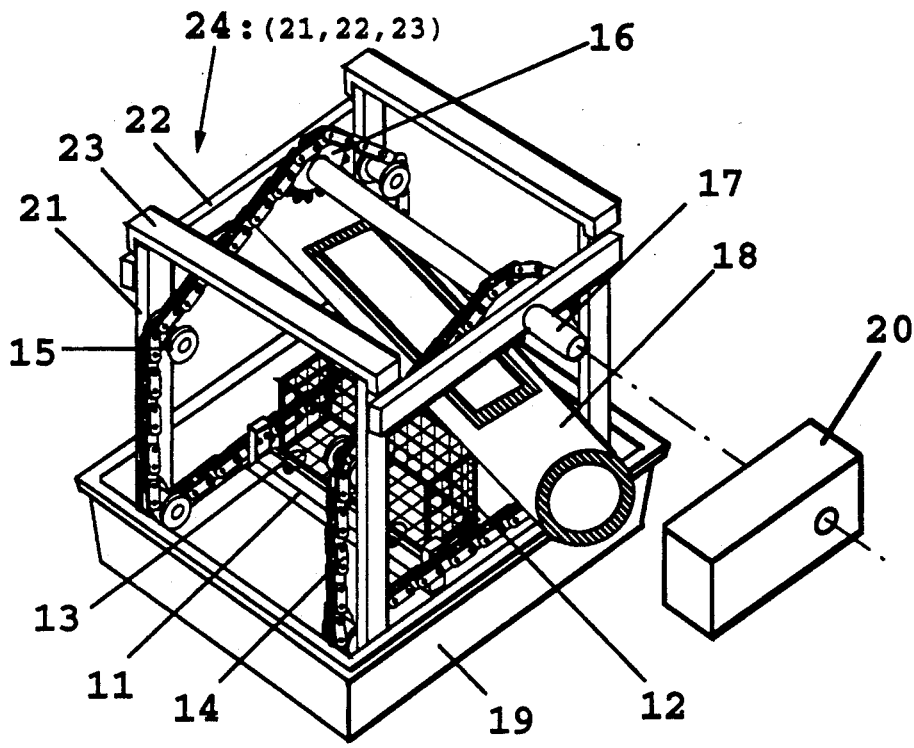
FIG. 1 shows an isometric view of the self cleaning cat box.

In accordance with the preferred embodiment of the present invention FIG. 1 shows a self cleaning cat litter box. A structural frame 24 is attached to a cat litter box 19. The preferred embodiment of frame 24 is comprised of vertical members 21, and horizontal members 22 and 23; however, any other combination of flat, angle, or channel members may be substituted to form rectangular, trapezoidal, triangular or any suitable geometry for the structural frame. Chain guides 15 are attached to frame 24. An axle 17 with sprockets 16 runs through holes in frame 24 or may be attached to frame 24 by any other suitable means. Chains 14 wrap around the chain guides 15 and sprockets 16; however, a perforated belt or any other suitable means may be substituted for chain 14. A blade 11 is attached between chains 14 and a basket 12 is pivotally attached to blade 11. A chute 18 is oriented parallel to axle 17 and is inclined vertically with one end of chute 18 being higher than the opposite end of chute 18. A power source 20 is attached to one end of axle 17. Power source 20 may be a motor, motor with gear reduction, a hand crank, an adjacent hand crank with gear, sprocket, or chain and sprocket(s) reduction means connecting it to axle 17 or any other suitable means of imparting rotational force to axle 17.

Figure 2A:
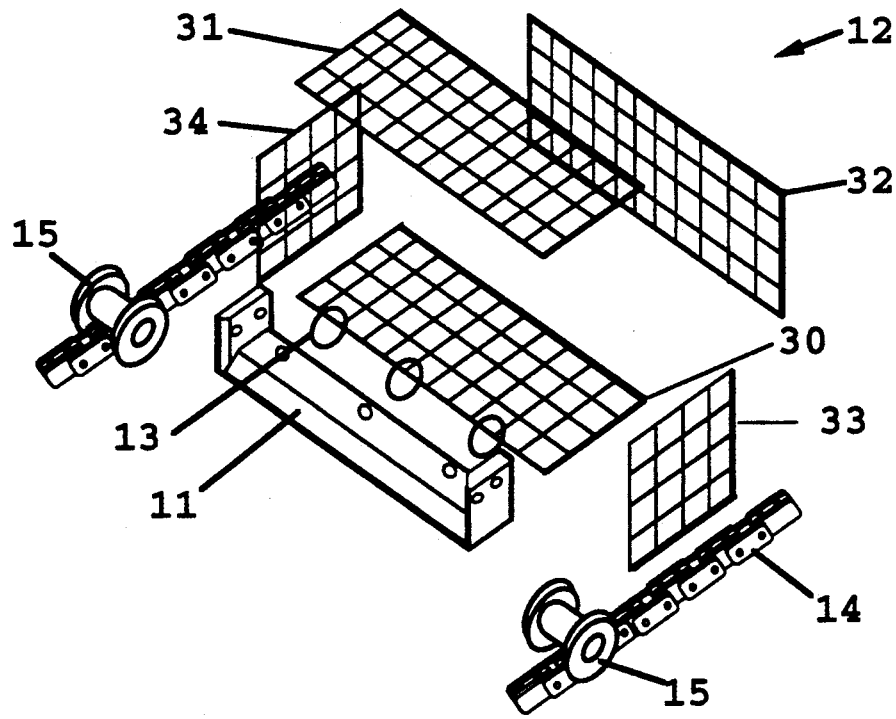
FIG. 2A shows an exploded view of the blade, basket, and spool guides; 2B shows a basket pivot resistance member; 2C shows an alternate basket.

FIG. 2A shows an exploded view of blade 11, basket 12, chain guides 15 and chain 14. Blade 11 is a horizontal member tapered towards the front (leading edge) and having its extremes bent upwards or with vertical members attached at its extremes. The preferred embodiment of blade 11 has the vertical part of blade 11 tapered at the leading edge to facilitate entry into the spool guides; however, a non tapered version may be substituted. The horizontal part of blade 11 may include perforations to reduce resistance and shifting of the cat litter material during operation. The vertical parts of blade 11 have holes that allow the blade to be attached to chains 14 by screws, rivets or any other suitable means. One embodiment of basket 12 is essentially a five sided rectangle 30, 31, 32, 33, 34 with the front (leading side) missing; however, any suitable geometric shape may be substituted. Basket 12 can be made from wire mesh or any suitable material. The wire mesh may include a larger spacing mesh for structural support with a finer spacing mesh attached for better sifting ability. FIG. 2A shows the sides of basket 12 as separate for clarity; however, basket 12 may actually be constructed from either one or more than one continuous piece(s) that is bent to form the desired geometry. Where needed the pieces of basket 12 may be connected to each other by ferrules or any other suitable means. The leading edge of the basket or any part thereof may be surrounded by an optional protective sheath of a suitable material to offer protection from burns. The leading edge of side 31 may be bent inwards (toward side 30) or extend further out and bent inwards to enhance its ability to contain more cat excrement on basket's 12 upward motion and/or to adjust the desired excrement placement during the dump into chute 18. The preferred embodiment shows basket 12 pivotally attached to blade 11 by rings traversing the floor piece of basket 12 and traversing holes in blade 11; however, hinges or any other suitable means of attachment may be substituted. Chain guides 15 may be comprised of a stack of washers bounded on both sides by fender washers to resemble a spool; however, any suitable substitute may be used to achieve the appearance of a spool or part of a spool and the functionality to guide the chain and blade along a desired path. The fender washers or spool walls of chain guides 15 may be bowed outward from the spool to facilitate entry of the blade into chain guide 15. Chain guides 15 that are not beneath the cat litter may also be substituted with freely rotating sprockets.

Figure 2B:
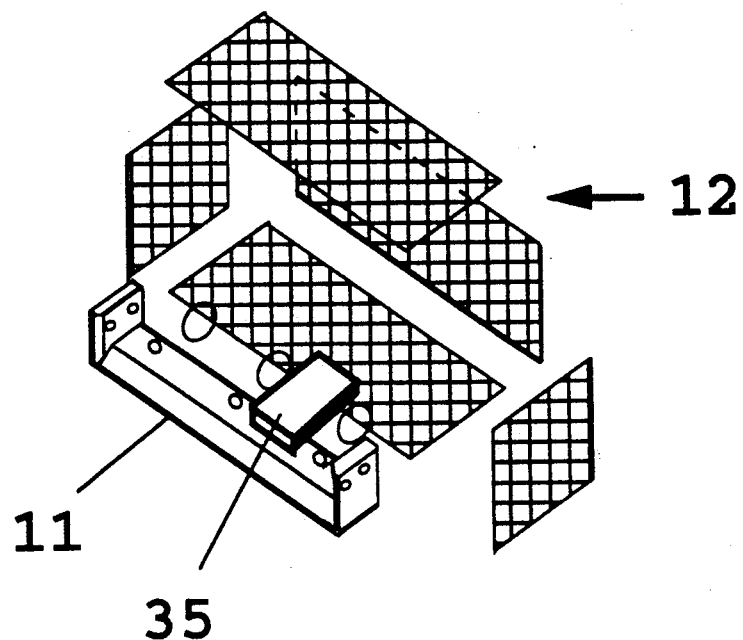

FIG. 2B shows an optional resilient member(s) 35 that may be attached to the horizontal part of blade 11 extending into basket 12 to limit the forward pivot range of basket 12. Member(s) 35 may also be made of a rigid or semi-rigid angled or perpendicular member(s) attached to blade 11.

Figure 2C:
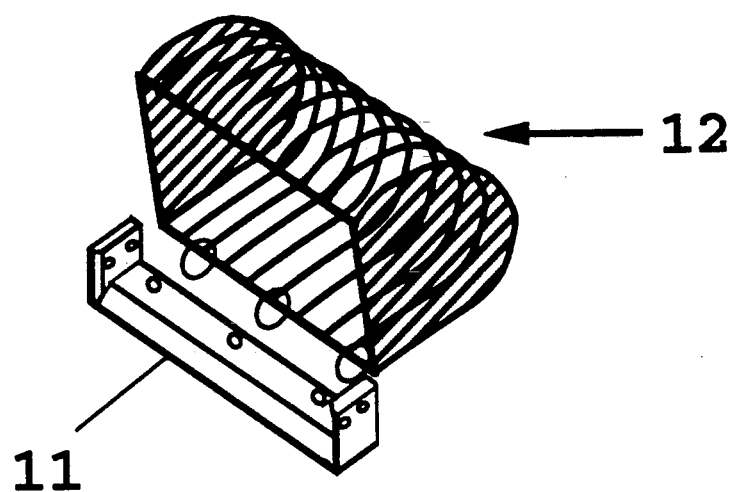

FIG. 2C shows an alternate basket 12. The shape is more oval and the vast majority of members are oriented parallel to each other.

Figure 3A:
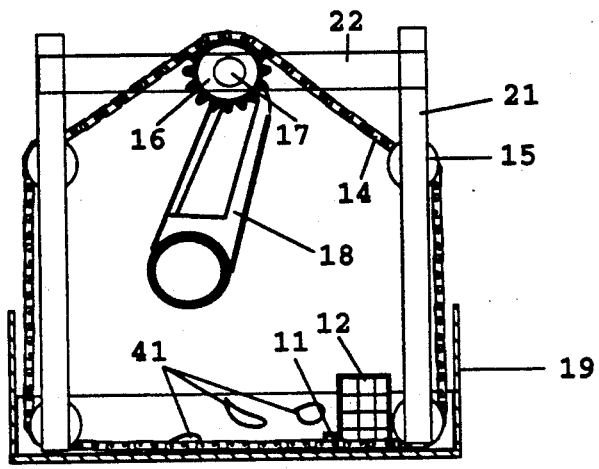
FIG. 3A to 3C are side views of the self cleaning cat box operation.
Figure 3B:
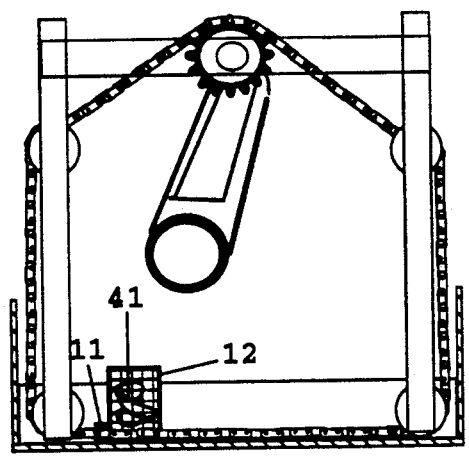
Figure 3C:
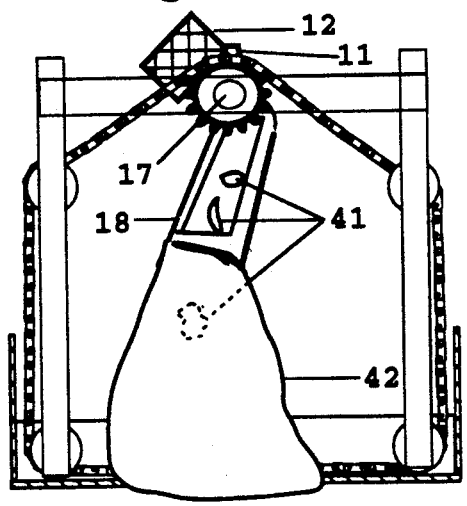

FIG. 3A shows a side view of the self cleaning cat litter box as blade 11 and basket 12 have just entered the cat box 19 which has cat excrement 41 in it. FIG. 3B shows blade 11 and basket 12 after they have moved through the cat box and the cat excrement 41 is now in basket 12. FIG. 3C shows the position of basket 12 as it is pivoted by its contact with axle 17. Basket's 12 open side is now the floor and cat excrement 41 falls by gravity out of basket 12, down chute 18, and into bag 42. Although the preferred embodiment uses axle 17 as the means of tipping basket 12, an alternative may be to place a protruding piece anywhere along the upper horizontal path of basket 12 and adjust the placement of chute 18 accordingly.

Figure 4A:
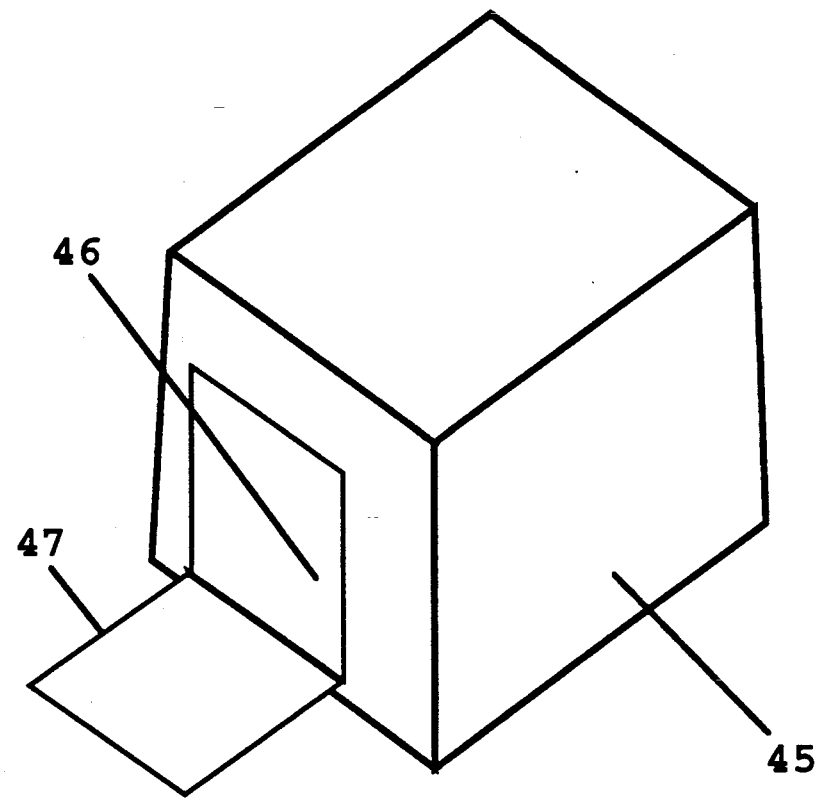
FIG. 4A shows a protective cover; 4B shows a lateral access restricting guard.

FIG. 4A shows a protective cover that fits over frame 24 and rests on the upper rim of box 19. An opening 46 is provided so the cat may enter and a closure 47 may be pivotally attached at the bottom of opening 46 as shown or, to the top of opening 46. The side opposite the pivotal attachment of closure 47 may include a latch mechanism and receptacle for the latch attached to cover 45 or frame 24 so that the closure may be shut preventing access during operation of the self cleaning cat litter box. Closure 47 may include a device to prevent the self cleaning cat box from operating unless closure 47 is latched shut.

Figure 4B:
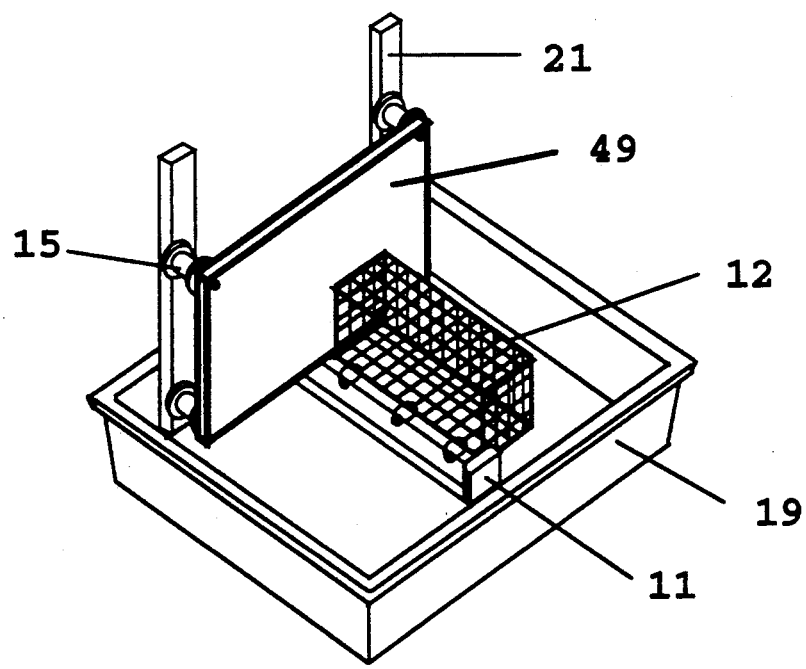

FIG. 4B shows a lateral guard 49 which is a substantially flat piece oriented vertically along the vertical frame members 21. Guards 49 restrict the area the cat can use to that which can effectively be cleaned by blade 11 and basket 12.

Figure 5A:
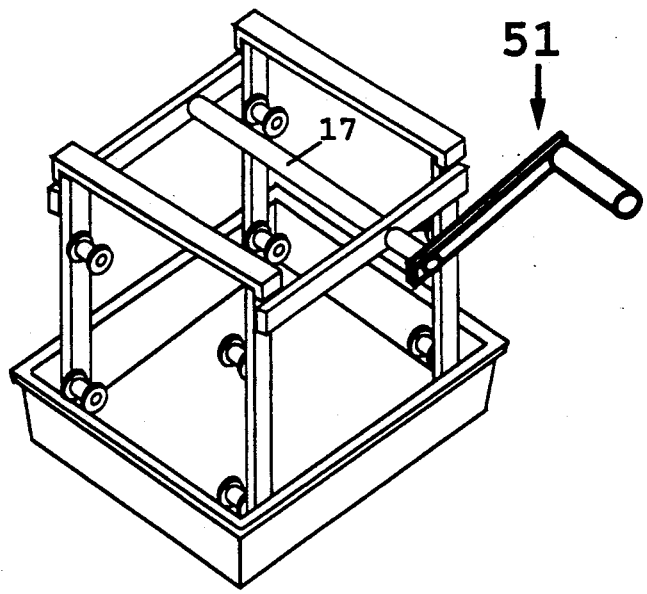
FIG. 5A shows a hand crank power source; 5B shows a hand crank and gear or sprocket power source.

FIG. 5A shows an hand crank 51 attached directly to axle 17 as an alternative to the motor and gear power source 20.

Figure 5B:
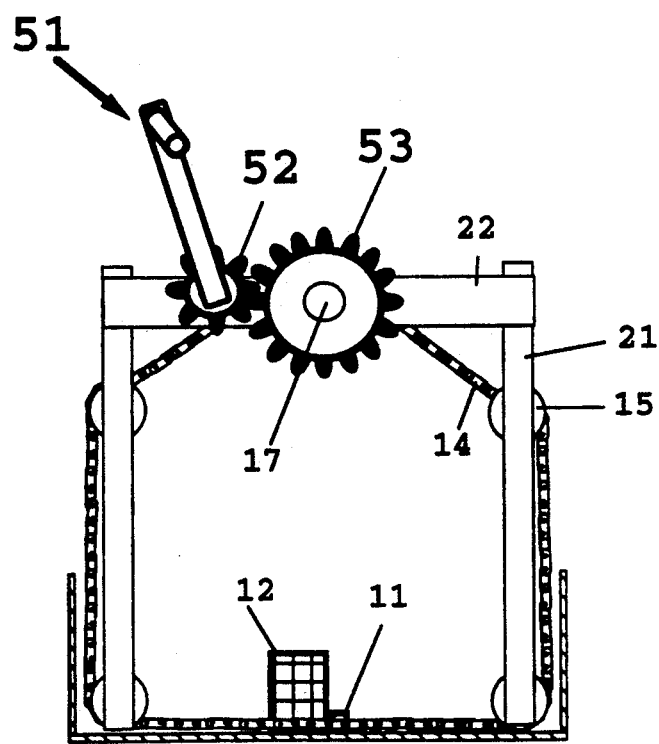

FIG. 5B shows a hand crank 51 and gears or sprockets 52 and 53 as an alternative power source. A circular piece of chain attached to handle 51 may be substituted for sprocket 52 when a sprocket is used for 53. When 52 and 53 are sprockets they may be connected by a chain rather than by direct contact. Note blade 11 and basket 12 have been oriented in the opposite direction so that the familiar clockwise rotational force may be applied to handle 51 in order to operate the self cleaning cat litter box.

DETAILED OPERATIONAL DESCRIPTION OF INVENTION

FIGS. 3A, 3B, and 3C have been prepared to facilitate the operational description of the invention. In the three figures the invention is designed to accept a rotational force on axle 17 in a clockwise direction; however, it could also be designed to accept a counterclockwise rotation by simply attaching blade 11 and basket 12 in the opposite direction.

A rotational force applied to axle 17 is transferred as a rotational force to sprockets 16 which in turn moves chains 14 through spool guides 15. In FIG. 3A the clockwise rotational force would result in blade 11 and basket 12 moving from right to left across the cat litter box. A certain amount of slack in chains 14 and the geometry of blade 11 causes it to pitch slightly downward. This enables blade 11 to scrape the bottom of the cat litter box with its tapered end. When blade 11 encounters clumped urine that has adhered to the floor of the cat litter box it severs the attached urine clump from the floor of the cat box and the clump is subsequently collected by basket 12. Cat excrement distributed throughout the cat litter material is collected by the basket as it moves through the cat litter box. FIG. 3B shows basket 12 containing the cat excrement at the opposite end of the cat litter box. Basket 12 then starts its upward journey. When basket 12 encounters axle 17 it is pushed backwards and its contents fall into inclined chute 18. The cat excrement then slides down the chute and into a receptacle such as a plastic garbage bag 37. At some point after the dump the unit may either be manually shut off or automatically shut off by either a mechanical, electronic, photo electric or other suitable means. In the hand crank versions shown in FIG. 5A and 5B the rotational force is provided manually by the user.

CONCLUSION, RAMIFICATIONS AND SCOPE OF INVENTION

The described invention provides a simple device for cleaning animal excrement from litter boxes while reducing both human exposure and human work required.

While my invention contains many specificities and subordinate devices and assemblies, these should not be construed as limitations on the scope of invention or scope of use for the subordinate devices or assemblies, but rather as an exemplification of one preferred embodiment for one particular application. Many other variations and applications are possible. Some examples of possible variations are: The number of chain guides may be reduced if the axle with sprockets is moved to one end of the apparatus and substituted in place of one of the upper sets of chain guides. The chains may be substituted with perforated belts and the blade and blade attachment means modified so as to attach to the belts. Many variations of the chute are possible including concave members and large diameter plastic piping with various portion(s) cut away.

My description of the self cleaning cat litter box contains the essential operating parts but this should not be construed to limit ancillary or optional items that may be added to the invention. For example multiple or different scraping and cleaning devices may be attached between the chains at various intervals. Cat litter material leveling or redistributing devices may also be attached either between the chains or as a foot or hand actuated device to lift one end of the invention. Additional openings and/or receptacles may be provided to facilitate the storage and/or infusion of new litter material into the apparatus.

I claim:
1. A Self cleaning cat litter box comprising:
   a) a structural framework attached to or residing in a cat litter box, said framework having chain guides attached to said framework
   b) an axle with sprockets, attached to said framework in a manner to allow rotation
   c) a means for applying rotational force to said axle
   d) chains circulating through said chain guides and said sprockets
   e) a blade attached between the chains and a straining basket pivotally attached to said blade
   g) a means of conveying contents of the straining basket to a disposal receptacle.
2. Apparatus as in claim 1 wherein said blade has multiple perforations.
3. Apparatus as in claim 1 wherein said straining basket is composed of wire mesh.
4. Apparatus as in claim 1 wherein said straining basket is composed of tines.
5. Apparatus as in claim 1 wherein said blade has basket pivot resistance or restricting means attached.

* * * * *